United States Patent
Nagato et al.

(10) Patent No.: US 9,175,177 B2
(45) Date of Patent: Nov. 3, 2015

(54) COATING COMPOSITION

(75) Inventors: Masaru Nagato, Settsu (JP); Masahiko Maeda, Settsu (JP); Tetsuya Masutani, Settsu (JP); Satoshi Onodera, Ichihara (JP); Eiji Kitaura, Ichihara (JP); Motoshi Sasaki, Ichihara (JP); Peter Cheshire Hupfield, Mid Glamorgan (GB)

(73) Assignees: DAIKIN INDUSTRIES, LTD., Osaka (JP); DOW CORNING CORPORATION, Midland, MI (US)

( * ) Notice: Subject to any disclaimer, the term of this patent is extended or adjusted under 35 U.S.C. 154(b) by 1059 days.

(21) Appl. No.: 12/523,914

(22) PCT Filed: Jan. 18, 2008

(86) PCT No.: PCT/JP2008/050585
§ 371 (c)(1),
(2), (4) Date: Mar. 4, 2010

(87) PCT Pub. No.: WO2005/190812
PCT Pub. Date: Jul. 31, 2008

(65) Prior Publication Data
US 2010/0168304 A1    Jul. 1, 2010

(30) Foreign Application Priority Data
Jan. 23, 2007 (JP) ................ 2007-013108

(51) Int. Cl.
*C09D 7/12* (2006.01)
*C09D 167/00* (2006.01)
*C08G 77/24* (2006.01)
*C08K 5/54* (2006.01)
*C08L 61/20* (2006.01)
*C08L 83/02* (2006.01)

(52) U.S. Cl.
CPC ............ *C09D 7/1233* (2013.01); *C09D 167/00* (2013.01); *C08G 77/24* (2013.01); *C08K 5/5406* (2013.01); *C08L 61/20* (2013.01); *C08L 83/02* (2013.01)

(58) Field of Classification Search
CPC .................................................... C09D 7/1233
USPC ............................................ 528/36; 525/447
See application file for complete search history.

(56) References Cited

U.S. PATENT DOCUMENTS

| 6,075,110 A | 6/2000 | Mohri et al. |
| 2001/0031850 A1* | 10/2001 | Mohri et al. ............... 528/42 |
| 2001/0036985 A1* | 11/2001 | Lee et al. ............... 524/261 |

FOREIGN PATENT DOCUMENTS

| JP | 11-217540 A | 8/1999 |
| WO | 96/26254 A1 | 8/1996 |
| WO | 01/60923 A1 | 8/2001 |
| WO | 2004/067658 A1 | 8/2004 |

* cited by examiner

Primary Examiner — Kuo-Liang Peng
(74) Attorney, Agent, or Firm — Sughrue Mion, PLLC

(57) ABSTRACT

There is provided a polyester coating composition having excellent action of preventing deposition of outdoor stain and stain caused by rainfall, being capable of extending a period of time (pot life) from the mixing to the coating, and comprising (A) a polyester resin, (B) one or more of fluorine-containing organosilicon compounds having a fluorine content of 5 to 30% by mass, (C) one or more of aliphatic hydrocarbon compounds having hydroxyl group and 1 to 10 carbon atoms, in which a part of hydrogen atoms bonded to carbon atom may be substituted by fluorine atoms and/or one or more of alkoxy compounds having 2 to 10 carbon atoms, in which a part of hydrogen atoms bonded to carbon atom may be substituted by fluorine atoms, and (D) an organic solvent.

8 Claims, No Drawings

COATING COMPOSITION

TECHNICAL FIELD

The present invention relates to a polyester coating composition assuring an extended duration of stain deposition inhibiting property, particularly to a polyester coating composition suitable as coatings for building materials, construction, automobiles and electric appliances and as a heavy duty coating.

BACKGROUND ART

So far, polyester coatings are used in many cases for outdoor coating of roofs and walls, especially for coating of a metal plate called pre-coat metal (PCM) which is processed after the coating. This is because polyester coatings are excellent in processability, transparency, curability and coloring property.

However, recently as environmental changes such as air pollution advance, a lot of oil droplets and dusts have come to be contained in the air, and as a result, there are problems that coating films on building materials and automobiles are easily stained more than before and such stains are difficult to remove.

Accordingly, coating films formed are demanded to have property of inhibiting deposition of outdoor stains for a long period of time from an initial stage of coating.

For improving such property of inhibiting deposition of stains, there have been developed techniques of blending a silane compound to a coating composition to make a coating film surface hydrophilic, thus making hydrophobic stains to be hardly deposited, and further removing deposited stains with flowing raindrop or the like (WO 94/06870, JP4-275379A, U.S. Pat. No. 6,486,239 and JP7-82520A).

However, a degree of hydrophilization of a coating film surface and repeatability thereof are still insufficient, long-term property of inhibiting deposition of stains is not always secured, and a large amount of silane compound is required for making a coating film surface hydrophilic. As a result, coatings are not satisfactory from the viewpoint of curability, compatibility, re-coatability, storage stability, a life (pot life) from mixing to coating, anti-floating property, defoaming property, workability in coating and processability of a coating film.

Also, there are known techniques of using an additive prepared by modifying a silicate compound with fluorine for the purpose of exhibiting hydrophilic property from an initial stage of coating (WO 96/26254, JP2001-151970A and JP11-333992A).

However, any of the mentioned techniques are not satisfactory from the viewpoint of re-coatability, storage stability, pot life, defoaming property, workability in coating and processability of a coating film. Especially, hydrophilic property and property of inhibiting deposition of stain of an obtained coating film are greatly lowered because a pot life is short and hydrolysis occurs in the coating composition before coating and gelling starts due to condensation unless coating is initiated soon after blending of a coating.

DISCLOSURE OF INVENTION

It is an object of the present invention to provide a polyester coating composition having excellent action of preventing deposition of outdoor stain and stain resulting from rainfall and being capable of extending a life (pot life) from the mixing to the coating.

Namely, the present invention relates to a coating composition comprising:
(A) a polyester resin,
(B) at least one of fluorine-containing organosilicon compound having a fluorine content of 5 to 30% by mass and represented by the formula (I).

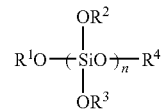

wherein $R^1$, $R^2$, $R^3$ and $R^4$ are the same or different and each is an alkyl group having 1 to 20 carbon atoms which may have hetero atom and may have polymerizable carbon-carbon double bond at its end; "n" is an integer of 1 to 30; at least one of $R^1$, $R^2$, $R^3$ and $R^4$ has fluorine atom,
(C) at least one of aliphatic hydrocarbon compound having hydroxyl group and 1 to 10 carbon atoms, in which a part of hydrogen atoms bonded to carbon atom may be substituted by fluorine atoms and/or at least one of alkoxy compound having 2 to 10 carbon atoms, in which a part of hydrogen atoms bonded to carbon atom may be substituted by fluorine atoms, and
(D) an organic solvent.

In the present invention, it is preferable that the fluorine content of the fluorine-containing organosilicon compound (B) is 7 to 20% by mass, from the viewpoint of satisfactory concentration at a coating film surface and hydrolyzability and since a pot life is extended satisfactorily.

In the present invention, when 5 to 95% by mass of the fluorine-containing organosilicon compound (B) is replaced by a non-fluorine-containing organosilicon compound (G), namely, when the fluorine-containing organosilicon compound (B) and the non-fluorine-containing organosilicon compound (G) are used together, there can be provided a coating composition being excellent in a degree of hydrophilization and property of inhibiting deposition of stains and having reduced fluorine content in the whole composition.

In the present invention, it is preferable that fluorine atom is not contained in the aliphatic hydrocarbon compound and/or the alkoxy compound (C) since solubility in the organic solvent is satisfactory.

In the present invention, it is preferable that the aliphatic hydrocarbon compound and/or the alkoxy compound (C) is a non-fluorine-containing alcohol or a non-fluorine-containing alkoxy compound, from the viewpoint of satisfactory effect of further extending a pot life.

In the present invention, it is preferable that the organic solvent (D) is a hydrocarbon solvent and/or a ketone solvent, from the viewpoint of excellent solubility of the resin and low price.

In the present invention, it is preferable that the fluorine-containing organosilicon compound (B) is contained in an amount of 0.01 to 40 parts by mass and the aliphatic hydrocarbon compound and/or alkoxy compound (C) is contained in an amount of 0.01 to 500 parts by mass based on 100 parts by mass of the polyester resin (A), and the amount of organic solvent (D) is an amount to provide a solid content of 0.1 to 90% by mass.

In the present invention, it is preferable that the polyester resin (A) is a polyester resin having functional group and the composition further comprises a curing agent (E) for curing the resin, from the viewpoint that strength and hardness, durability and water resistance of a coating film are satisfactory.

In the present invention, it is preferable that the polyester resin (A) is a polyester resin having hydroxyl group and the curing agent (E) is an amino resin curing agent since a curing time can be shortened.

In the present invention, it is preferable that the curing agent (E) is contained in an amount of 5 to 150 parts by mass based on 100 parts by mass of the polyester resin (A), since proper time for curing is assured and balance between hardness and flexibility is satisfactory.

BEST MODE FOR CARRYING OUT THE INVENTION

The coating composition of the present invention comprises:
(A) the polyester resin,
(B) the fluorine-containing organosilicon compound having a fluorine content of 5 to 30% by mass and represented by the above-mentioned formula (I),
(C) the hydroxyl group-containing aliphatic hydrocarbon compound and/or alkoxy compound, and
(D) the organic solvent.

Each component is explained below.
(A) Polyester Resin

The polyester resin is a product (esterification product) obtained by condensation polymerization reaction of a polybasic acid component and a polyalcohol component.

Example of a polybasic acid component to be used mainly is at least one of dibasic acid selected from phthalic anhydride, isophthalic acid, terephthalic acid, tetrahydrophthalic anhydride, hexahydrophthalic anhydride, succinic acid, fumaric acid, adipic acid, sebacic acid and maleic anhydride or lower alkyl ester compound of these acids. If necessary, a monobasic acid such as benzoic acid, crotonic acid or p-t-butylbenzoic acid may be used together.

Examples of a polyalcohol component to be used mainly are polyalcohols such as ethylene glycol, diethylene glycol, propylene glycol, 1,4-butanediol, neopentylglycol, 3-methylpentanediol, 1,4-hexanediol and 1,6-hexanediol. These polybasic acid components and polyalcohol components can be used alone or can be used in a mixture of two or more thereof. The condensation polymerization reaction (esterification reaction or transesterification) of the polybasic acid component with the polyalcohol component can be carried out by a known method.

In the present invention, for improving strength, hardness, durability and water resistance of a coating film, it is preferable that the polyester resin has functional group. The functional group has action of not only providing cure site but also improving adhesion to substrates such as metals and ceramics.

Examples of such a functional group are hydroxyl group and carboxyl group.

For introducing functional group to the polyester resin, known methods are used. For example, carboxyl group can be introduced by using trivalent or more polybasic acid such as trimellitic anhydride, methylcyclohexene tricarboxylic acid or pyromellitic dianhydride together as a part of polybasic acid components. Also, hydroxyl group can be introduced by using trivalent or more polyalcohol such as trimethylolethane, trimethylolpropane or pentaerythritol together as a part of polyalcohol components.

Further, the polyester resin may be one modified with fatty acid of fat and oil (so-called alkyd resin), modified polyester resins such as urethane-modified polyester resin and epoxy-modified polyester resin, and further silicone-modified polyester polyol resin.

The polyester resin modified with fatty acid of fat and oil is one obtained by reaction of a fatty acid of fat and oil in addition to the polybasic acid component and the polyalcohol component of the polyester resin having or not having the above-mentioned functional group. Examples of fatty acid of fat and oil are fatty acids of coconut oil, soya bean oil, linseed oil, safflower oil, tall oil, dehydrated caster oil and tung oil. The amount of fatty acid of oil and fat is preferably not more than 30% by mole, especially preferably about 5% by mole to about 20% by mole.

Urethane-modified polyester resin is one obtained by a known method of reacting a polyisocyanate compound with a low molecular weight polyester prepolymer prepared by reaction of a polybasic acid component and a polyalcohol component to be used for preparation of the above-mentioned polyester resin (or polyester resin modified with fatty acid of fat and oil) having or not having the above-mentioned functional group or the above-mentioned polyester resin (or polyester resin modified with fatty acid of fat and oil).

Examples of a polyisocyanate compound which can be used for modifying with urethane are hexamethylene diisocyanate, isophorone diisocyanate, xylylene diisocyanate, tolylene diisocyanate, 4,4'-diphenylmethane diisocyanate, 4,4'-methylenebis(cyclohexyl isocyanate) and 2,4,6-triisocyanate toluene. In these urethane-modified polyester resins, it is preferable that an amount of modification with urethane is 0.1 to 30% by mass based on the urethane-modified polyester resin, from the viewpoint of satisfactory drying property, hardness and adhesion.

Examples of epoxy-modified polyester resin are reaction products obtained by addition reaction, condensation reaction or graft reaction of the polyester resin having functional group with an epoxy resin by using a polyester resin prepared from each component to be used for preparation of the above-mentioned polyester resin having functional group, such as reaction products obtained by reaction of carboxyl group of the polyester resin having functional group with an epoxy-containing resin, and reaction products obtained by bonding hydroxyl group in the polyester resin having functional group to hydroxyl group in an epoxy resin via a polyisocyanate compound. In these epoxy-modified polyester resins, it is preferable that an amount of modification with epoxy resin is 0.1 to 30% by mass based on the epoxy-modified polyester resin, from the viewpoint of satisfactory flexibility, adhesion and impact resistance.

Preferred polyester resin (A) is one having a number average molecular weight of not less than 1,000, further not less than 2,000, from the viewpoint of satisfactory strength, durability, water resistance and processability of a coating film, and one having a number average molecular weight of not more than 50,000, further not more than 30,000, from the viewpoint of satisfactory dispersibility, solubility in the solvent and viscosity at coating.

Also, the glass transition temperature (Tg) is preferably not less than $-40°$ C., further preferably not less than $-20°$ C., from the viewpoint of satisfactory drying property and hardness, and the glass transition temperature (Tg) is preferably not more than $100°$ C., further preferably not more than $80°$ C., from the viewpoint of satisfactory flexibility and processability.

Silicone-modified polyester polyol resin is synthesized, for example, by condensation reaction of a polyester resin having hydroxyl group with an intermediate of silicone having alkoxysilyl group or silanol group. Also silicone-modified polyester polyol resin can be prepared by adding an intermediate of silicone such as a reactive silicone oligomer having hydroxyl group or carboxyl group to a polyalcohol and a polybasic acid to be used as a starting material for preparing polyester and then conducting condensation polymerization at 220° to 280° C. Examples of a usable intermediate of silicone are phenyl-modified dimethyl silicone having hydroxyl group and phenyl-modified dimethyl silicone having alkoxysilyl group.

In these silicone-modified polyester polyol resins, it is preferable that an amount of resin modification with silicone is 0.1 to 50% by mass based on the silicone-modified polyester polyol resin, from the viewpoint of satisfactory weather resistance, flexibility and resistance to salt water.

Among these, polyester resins having hydroxyl group or carboxyl group as functional group are preferred from the viewpoint of satisfactory curability of a coating film.

With respect to hydroxyl group-containing polyester resins, from the viewpoint of balance between processability, hardness, curability and anti-foaming property of the obtained coating film, the hydroxyl value thereof is within a range from 40 to 200 mgKOH/g, especially from 50 to 120 mgKOH/g, the number average molecular weight thereof is within a range from 1,000 to 30,000, especially from 2,000 to 10,000, and the glass transition temperature (Tg) thereof is within a range from −40° C. to 100° C., especially from −20° C. to 80° C.

With respect to carboxyl-containing polyester resins, from the viewpoint of balance between processability, hardness, curability and anti-foaming property, the acid value thereof is within a range from 2 to 30 mgKOH/g, especially from 5 to 10 mgKOH/g, the number average molecular weight thereof is within a range from 1,000 to 30,000, especially from 2,000 to 10,000, and the glass transition temperature (Tg) thereof is within a range from −40° C. to 100° C., especially from −20° C. to 80° C.

In the case where the polyester resin (A) is a curable polyester resin having a curable functional group, it is preferable to undergo curing by using the curing agent (E) together. The curing agent may be optionally selected from known curing agents depending on kind of a curable functional group.

For example, when a curable functional group is hydroxyl group, an isocyanate curing agent and an amino resin curing agent can be preferably used.

Non-limiting examples of an isocyanate curing agent are, for instance, 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets thereof, polymers thereof having at least two isocyanate groups, blocked isocyanates (examples of a blocking agent are phenol, ε-caprolactam, methanol, methyl ethyl ketoxime, dimethyl malonate and acetylacetone) and the like.

Non-limiting examples of an amino resin curing agent are, for instance, urea resin, melamine resin, benzoguanamine resin, glycoluril resin, methylolated melamine resin obtained by methylolating melamine, alkyl-etherified melamine resin obtained by etherification of methylolated melamine with alcohol such as methanol, ethanol or butanol.

Among these curing agents (E), amino resin curing agents are especially preferred since a curing time can be shortened.

It is preferable that the amount of curing agent (E) is 5 to 150 parts by mass, further preferably 10 to 100 parts by mass based on 100 parts by mass of the polyester resin (A), since a proper curing time is assured and balance between hardness and flexibility is satisfactory.

Also, if necessary, a curing catalyst (F) may be blended. The curing catalyst (F) may be properly selected depending on the curing agent (E). Examples are organotin catalysts such as dibutyltin dilaurate and tin octylate; metallic catalysts such as organotitanium, aluminum chelate, titanium chelate and zirconium chelate catalysts; amine-based compounds; sulfonic acid compounds such as p-toluenesulfonic acid and dodecylbenzenesulfonic acid; sulfonic acid compounds, in which a part or the whole of acids thereof is neutralized with amine; and the like.

It is preferable that the amount of curing catalyst (F) is 0.001 to 5% by mass, further preferably 0.01 to 1% by mass based on the total amount of polyester resin and curing agent.

(B) Fluorine-Containing Organosilicon Compound Having a Fluorine Content of 5 to 30% by Mass and Represented by the Formula (I):

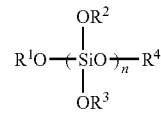

$R^1$, $R^2$, $R^3$ and $R^4$ are the same or different and each is an alkyl group having 1 to 20 carbon atoms which may have hetero atom and may have polymerizable carbon-carbon double bond at its end. At least one of $R^1$, $R^2$, $R^3$ and $R^4$ has fluorine atom. Examples of hetero atom are oxygen atom, nitrogen atom, sulfur atom and silicon atom.

Examples thereof are non-fluorine-containing alkyl groups having 1 to 20 carbon atoms such as $CH_3$, $C_2H_5$, $CH_3CH_2CH_2$, $(CH_3)_2CH$, $CH_3(CH_2)_2CH_2$ and $CH_3CH_2CH_2CH_2CH(C_2H_5)CH_2$; fluorine-containing alkyl groups having 1 to 20 carbon atoms such as $CF_3$, $C_2F_5$, $CF_3CF_2CH_2$, $CF_3(CF_2)_2CH_2$, $CF_3(CF_2)_3CH_2CH_2$, $CF_3(CF_2)_4CH_2CH_2$, $CF_3(CF_2)_5CH_2CH_2$, $CF_3(CF_2)_7CH_2CH_2$, $CF_3CHFCF_2CH_2$, $CF_3CF(CHF_2)CH_2$, $CF_3C=O$, $CF_3CF_2C=O$, $H(CF_2)_2CH_2$, $H(CF_2)_4CH_2$ and $H(CF_2)_6CH_2$, or one or more thereof.

At least one of $R^1$, $R^2$, $R^3$ and $R^4$ is a group having fluorine atom, for example, a fluorine-containing alkyl group or a fluorine-containing alkoxysilyl group.

"n" is an integer of 1 to 30, preferably an integer of 2 to 20.

The fluorine content of the fluorine-containing organosilicon compound (B) is 5 to 30% by mass. For example, in the fluorine-containing organosilicon compound represented by the formula (I), in the case of the compound having relatively high fluorine content, in which $R^1=R^2=R^3=R^4=CF_3$ and "n" is 1, its fluorine content is 62% by mass, and the fluorine-containing organosilicon compound to be used in the present invention is a compound having a relatively low fluorine content. A preferred fluorine content is not less than 5% by mass, further not less than 7% by mass, especially not less than 10% by mass from the viewpoint of satisfactory concentration of a coating film surface and hydrolyzability, and is not more than 30% by mass, further not more than 25% by mass, especially not more than 20% by mass since a pot life is extended satisfactorily.

Non-limiting examples of the fluorine-containing organosilicon compound (B) are those having each substituent mentioned below in the formula (I).

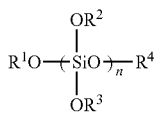

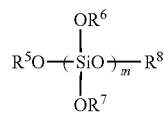

n=2; $R^1$, $R^2$, $R^3$ and $R^4$ are the same or different and each is $CF_3$ or $CH_3$ n=5; $R^1$, $R^2$, $R^3$ and $R^4$ are the same or different and each is $C_2F_5$ or $CH_3$ n=5; $R^1$, $R^2$, $R^3$ and $R^4$ are the same or different and each is $CF_3CHFCF_2CH_2$ or $C_2H_5$ n=8; $R^1$, $R^2$, $R^3$ and $R^4$ are the same or different and each is $C_2F_5CH_2$ or $C_2H_5$ n=10; $R^1$, $R^2$, $R^3$ and $R^4$ are the same or different and each is $C_2F_5CH_2$ or $CH_3$ n=10; $R^1$, $R^2$, $R^3$ and $R^4$ are the same or different and each is $CF_3CHFCF_2CH_2$ or $CH_3$ n=10; $R^1$, $R^2$, $R^3$ and $R^4$ are the same or different and each is $CF_3CHFCF_2CH_2$ or $C_2H_5$ n=10; $R^1$, $R^2$, $R^3$ and $R^4$ are the same or different and each is $CF_3CHFCF_2CH_2$, $C_2F_5CH_2$ or $CH_3$ n=10; $R^1$, $R^2$, $R^3$ and $R^4$ are the same or different and each is $CF_3(CF_2)_5CH_2CH_2$ or $CH_3$ n=10; $R^1$, $R^2$, $R^3$ and $R^4$ are the same or different and each is $HCF_2CF_2CH_2$ or $CH_3$ n=20; $R^1$, $R^2$, $R^3$ and $R^4$ are the same or different and each is $CF_3(CF_2)_5CH_2CH_2$ or $CH_3$ n=20; $R^1$, $R^2$, $R^3$ and $R^4$ are the same or different and each is $CF_3C=O$ or $CH_3$ These may be used alone or may be used in combination of two or more thereof. In the case of combination use, preferred are a combination of a fluorine-containing organosilicon compound having $CH_3$ group at its non-fluorine-containing portion with a compound having $C_2H_5$ group, a combination of a compound having a high fluorine content with a compound having a low fluorine content, a combination of a compound having a high molecular weight with a compound having a low molecular weight, and a combination of a fluorine-containing silicon compound with a non-fluorine-containing silicon compound, from the viewpoint of satisfactory concentration of a coating film surface, hydrolyzability and cost and since a pot life is extended satisfactorily.

The amount of fluorine-containing organosilicon compound (B) is preferably 0.01 to 40 parts by mass, further preferably 0.2 to 10 parts by mass, especially preferably 0.5 to 5 parts by mass based on 100 parts by mass of the polyester resin, from the viewpoint of satisfactory water resistance, transparency, chemical resistance and resistance to spotting and since a pot life is extended satisfactorily.

In the present invention, a part of the fluorine-containing organosilicon compound (B), preferably 5 to 95% by mass thereof may be replaced by the non-fluorine-containing organosilicon compound (G). When the fluorine-containing organosilicon compound (B) is used together with the non-fluorine-containing organosilicon compound (G), a coating composition being excellent in a degree of hydrophilization and property of inhibiting deposition of stain and having reduced fluorine content in the whole composition can be provided.

Examples of the non-fluorine-containing organosilicon compound (G) are non-fluorine-containing organosilicon compounds represented by the formula (II):

wherein $R^5$, $R^6$, $R^7$ and $R^8$ are the same or different and each is an alkyl group having 1 to 20 carbon atoms which may have hetero atom and may have polymerizable carbon-carbon double bond at its end; "m" is an integer of 1 to 30.

Examples of hetero atom are oxygen atom, nitrogen atom, sulfur atom and silicon atom, and "m" is preferably an integer of 2 to 20.

Examples thereof are one or more of alkyl groups having 1 to 20 carbon atoms such as $CH_3$, $C_2H_5$, $CH_3CH_2CH_2$, $(CH_3)_2CH$, $CH_3(CH_2)_2CH_2$ and $CH_3CH_2CH_2CH_2CH(C_2H_5)CH_2$.

Examples of the non-fluorine-containing organosilicon compound (G) are those, in which m=2; $R^5$, $R^6$, $R^7$ and $R^8$ are the same or different and each is $CH_3$ or $C_2H_5$ m=4; $R^5$, $R^6$, $R^7$ and $R^8$ are the same or different and each is $CH_3$ or $C_2H_5$ m=8; $R^5$, $R^6$, $R^7$ and $R^8$ are the same or different and each is $CH_3$ or $C_2H_5$ m=10; $R^5$, $R^6$, $R^7$ and $R^8$ are the same or different and each is $CH_3$ or $C_2H_5$ m=20; $R^5$, $R^6$, $R^7$ and $R^8$ are the same or different and each is $CH_3$ or $C_2H_5$ and the like.

Among these, the compound, in which "m" is 10; and $R^5$, $R^6$, $R^7$ and $R^8$ are $CH_3$, is preferred from the viewpoint of satisfactory degree of hydrophilization.

When the fluorine-containing organosilicon compound (B) is replaced by the non-fluorine-containing organosilicon compound (G), the proportion of the non-fluorine-containing organosilicon compound (G) is preferably 5 to 95% by mass, further preferably not less than 25% by mass, from the viewpoint of cost and since a pot life is extended satisfactorily. Also, the proportion is preferably not more than 75% by mass, especially preferably not more than 50% by mass, from the viewpoint of satisfactory hydrolyzability and surface concentration.

The total amount of the fluorine-containing organosilicon compound (B) and the non-fluorine-containing organo silicon compound (G) is the same as the above-mentioned amount of the fluorine-containing organosilicon compound (B).

The combination of the fluorine-containing organosilicon compound (B) with the non-fluorine-containing organosilicon compound (G) is not limited particularly, and the following combinations are preferred from the viewpoint of satisfactory degree of hydrophilization and since a pot life is extended satisfactorily.

Combination 1
(B): n=10; $R^1$, $R^2$, $R^3$ and $R^4$ are the same or different and each is $CF_3CHFCF_2CH_2$ or $CH_3$
(G): m=10; $R^5$, $R^6$, $R^7$ and $R^8$ are $CH_3$
Amount of replacement by (G): 25 to 50% by mass Combination 2
(B): n=10; $R^1$, $R^2$, $R^3$ and $R^4$ are the same or different and each is $CF_3CHFCF_2CH_2$ or $CH_3$
(G): m=4; $R^5$, $R^6$, $R^7$ and $R^8$ are $C_2H_5$
Amount of replacement by (G): 25 to 50% by mass Combination 3
(B): n=10; $R^1$, $R^2$, $R^3$ and $R^4$ are the same or different and each is $C_2F_5CH_2$ or $CH_3$
(G): m=10; $R^5$, $R^6$, $R^7$ and $R^8$ are $CH_3$ Amount of replacement by (G): 25 to 50% by mass (C) Hydroxyl Group-Containing Aliphatic Hydrocarbon Compound and/or Alkoxy Compound The hydroxyl group-containing aliphatic hydrocarbon compound (C1) is at least one of aliphatic hydrocarbon compound having hydroxyl group and 1 to 10 carbon atoms, in which a part of hydrogen atoms bonded to carbon atom may be substituted by fluorine atoms.

Examples thereof are one or more of non-fluorine-containing monovalent alcohols such as methanol, ethanol, propanol, isopropanol, butanol and octanol; non-fluorine-containing divalent alcohols such as ethylene glycol, diethylene glycol and polyethylene glycol (degree of polymerization: 3 to 100); non-fluorine-containing trivalent or more alcohols such as glycerin; fluorine-containing monovalent alcohols such as $CF_3CH_2OH$, $F(CF_2)_2CF_2OH$, $H(CF_2)_2CH_2OH$, $CF_3CHFCF_2CH_2OH$, $H(CF_2)_3CH_2OH$ and $H(CF_2)_4CH_2OH$; and fluorine-containing divalent alcohols such as $HOCH_2CF_2CF_2CF_2CF_2CH_2OH$. Among these, from the viewpoint of satisfactory compatibility, appearance of a coating film and volatility and since a pot life is extended satisfactorily, non-fluorine-containing monovalent alcohols, especially butanol, isopropanol and octanol are preferred. Non-fluorine-containing monovalent alcohols may be combined with each other, fluorine-containing monovalent alcohols may be combined with each other, and a non-fluorine-containing monovalent alcohol may be combined with a fluorine-containing monovalent alcohol.

The alkoxy compound (C2) is at least one of alkoxy compound having 2 to 10 carbon atoms, in which a part of hydrogen atoms bonded to carbon atom may be substituted by fluorine atoms.

Examples thereof are one or more of non-fluorine-containing monovalent alkoxy compounds such as triethoxymethane, methyl orthoformate, ethyl orthoformate, methyl orthoacetate, ethyl orthoacetate, $B(OC_2H_5)_3$ and $PO(OC_2H_5)_3$. Among these, non-fluorine-containing alkoxy compounds, especially triethoxymethane and ethyl orthoacetate are preferred.

The hydroxyl group-containing aliphatic hydrocarbon compounds (C1) and the alkoxy compounds (C2) may be used alone or may be used in a combination of two or more kinds thereof. In the case of combination use, a combination of butanol with ethyl orthoformate and a combination of a fluorine-containing monovalent alcohol with ethyl orthoformate are preferred from the viewpoint of satisfactory compatibility and since a pot life is extended satisfactorily.

In these components (C), those having no fluorine atom are preferred from the viewpoint of satisfactory solubility in the organic solvent, and further, non-fluorine-containing alcohols and non-fluorine-containing alkoxy compounds are preferred from the viewpoint of a satisfactory effect of extending a pot life.

The amount of hydroxyl group-containing aliphatic hydrocarbon compound and/or alkoxy compound (C) is preferably 0.01 to 500 parts by mass, further preferably 0.1 to 200 parts by mass based on 100 parts by mass of the polyester resin (A), from the viewpoint of satisfactory curability, volatility, appearance of a coating film and compatibility and since a pot life is extended satisfactorily.

(D) Organic Solvent

In the present invention, examples of usable organic solvents are hydrocarbon solvents, ketone solvents, ester solvents, ether solvents, amide solvents and sulfonic acid ester solvents. Non-limiting examples of preferred solvents are raised below.

Examples of hydrocarbon solvents are xylene, toluene, solvent naphtha 100, solvent naphtha 150, mineral spirit, octane and petroleum hydrocarbon solvents, and especially from the viewpoint of satisfactory compatibility, volatility and appearance of a coating film, toluene, xylene and solvent naphtha are preferred.

Examples of ketone solvents are acetone, methyl ethyl ketone, methyl isobutyl ketone, methyl amyl ketone, cyclohexanone and isophorone, and especially from the viewpoint of satisfactory compatibility, volatility and appearance of a coating film, methyl ethyl ketone, methyl isobutyl ketone and cyclohexanone are preferred.

Examples of ester solvents are ethyl acetate, butyl acetate, isobutyl acetate, ethylene glycol monomethyl ether acetate, ethylene glycol monoethyl ether acetate, diethylene glycol monoethyl ether acetate, propylene glycol monoethyl ether acetate, diethyl adipate, diethyl succinate and diethyl fumarate, and especially from the viewpoint of satisfactory compatibility, volatility and appearance of a coating film, butyl acetate, ethylene glycol monoethyl ether acetate, diethylene glycol monoethyl ether acetate and propylene glycol monoethyl ether acetate are preferred.

Examples of ether solvents are diethyl ether, dibutyl ether, ethylene glycol monoethyl ether and diethylene glycol monobutyl ether, and especially from the viewpoint of satisfactory compatibility, volatility and appearance of a coating film, ethylene glycol monoethyl ether and diethylene glycol monobutyl ether are preferred.

Examples of amide solvents are N,N-dimethylacetamide and N,N-dimethylformamide.

Examples of sulfonic acid ester solvents are dimethyl sulfoxide, and the like.

These solvents may be used alone, and may be used in a mixture of two or more kinds thereof.

From the viewpoint of satisfactory solubility of the resin and low price, hydrocarbon solvents, ketone solvents or solvent mixtures thereof are preferred as the organic solvent (D).

The organic solvent (D) is used to obtain homogeneous dissolution and dispersion of the coating composition, and its amount is preferably one enabling formation of a uniform coating film. Specifically the amount of organic solvent (D) is one providing a solid content in the coating composition of 0.1 to 90% by mass.

To the coating composition of the present invention may be added various additives which are usually added in the field of coating, in addition to the above-mentioned components, to an extent not to impair the object of the present invention. Examples of such additives are pigment, dye, filler, pigment dispersant, defoaming agent, leveling agent, anti-oxidant, ultraviolet absorber, thickener, flatting agent, anti-fungus agent, anti-skinning agent, flame retardant, anti-static agent, rust-preventive agent and silane coupling agent.

A process for preparing the coating composition of the present invention is not limited particularly, and each component may be mixed in an optional order and stirred.

For coating of the coating composition of the present invention, a usual method, for example, spray coating, roller coating, curtain flow coating, brush coating, roll coating, gravure coating, dip coating or bar coating can be used as it is.

Examples of articles (substrates) to be coated are metallic substrates such as stainless steel, steel sheet, aluminum and copper; cement substrates such as concrete and mortar; and plastic substrates such as polyvinyl chloride, polyester, polycarbonate and ABS resin, and the mentioned substrates subjected to surface treatment or coating. Especially steel sheet and aluminum are useful as substrates for coating of PCM.

EXAMPLE

The present invention is then explained by means of Examples and Comparative Examples, but is not limited to them. In the following examples, "part" represents part by mass and "%" represents % by mass.

Measuring methods used herein are as follows.
(NMR Analysis)
NMR measuring equipment: available from BRUKER
$^1$H-NMR measuring conditions: 300 MHz (tetramethylsilane=0 ppm)
$^{19}$F-NMR measuring conditions: 282 MHz (trichlorofluoromethane=0 ppm)
$^{13}$C-NMR measuring conditions: 400 MHz (tetramethylsilane=0 ppm)
(Elemental Analysis)
Measuring equipment: CHN CORDER available from Jay Science Kabushiki Kaisha and Ion Analyzer 901 available from Orion Research Kabushiki Kaisha
(Hydroxyl Value and Acid Value)
Calculated from composition obtained by NMR analysis and elemental analysis
(Number Average Molecular Weight)
Measuring equipment: GPC (model HLC-8020) available from Toso Kabushiki Kaisha
Measuring conditions: Three TSKgel:GMHXL columns, one G2500HXL column and one GRCXL-L column are used. Tetrahydrofuran is used as an eluate, and polystyrene of which molecular weight is known is used as a standard sample for measurement of a molecular weight.
(Fluorine Content)
A sample is burned to ashes by a flask combustion method, and then measuring is carried out using a fluorine ion meter and an amount of sample burnt is calculated.

Synthesis Example 1

Synthesis of Resin 1

Usual equipment for preparing polyester resin equipped with a heater, stirrer, refluxing device, water separator, rectifier and thermometer was used. To a polymerization reactor were charged:

| | |
|---|---|
| Trimethylolpropane | 11.14 parts |
| Neopentylglycol | 38.05 parts |
| Phthalic anhydride | 41.38 parts |
| Adipic acid | 24.16 parts | and the mixture was heated. After melting of the starting materials, stirring was initiated and a reaction temperature was elevated to 230° C. and was maintained at 230° C. for two hours. Generated water by condensation was distilled off through the rectifier to the outside of a reaction system. Then, 6 parts of solvent naphtha was charged in the reactor, and the reaction system was shifted to a solvent condensation method and the reaction was continued. When the acid value reached 2 mgKOH/g, the reaction was terminated and the reactor was cooled. After the cooling, 56 parts of solvent naphtha 100 was added to obtain a solution of polyester Resin 1 having a solid content of 65%. The hydroxyl value of the obtained Resin 1 was 58 mgKOH/g and the number average molecular weight thereof was about 2,800.

Synthesis Example 2

Synthesis of Resin 2

A solution of polyester Resin 2 having a solid content of 75% was prepared in the same manner as in Synthesis Example 1 except that the composition of charged components was changed to one mentioned below.

| | |
|---|---|
| Trimethylolpropane | 9.14 parts |
| Neopentylglycol | 38.05 parts |
| Isophthalic acid | 43.38 parts |
| Adipic acid | 24.16 parts |

The hydroxyl value of the obtained Resin 2 was 66 mgKOH/g and the number average molecular weight thereof was about 2,500.

Synthesis Example 3

Into a 200 ml four-necked flask equipped with a stirrer, thermometer and dropping funnel were poured 71 g (0.38 mol) of 2,2,3,4,4,4-hexafluorobutanol (available from DAIKIN INDUSTRIES, LTD., hereinafter referred to as "6FB"), 0.64 g (0.04 mol) of ion exchange water and 0.29 g of 35% hydrochloric acid, and then 147 g of MKC Silicate MS56 (methyl silicate available from MITSUBISHI CHEMICAL CORPORATION, decamer in average) was poured in the flask with stirring. After one-hour refluxing, components having a low boiling point were distilled off. When flowing out of a distillate stopped, the flask was cooled and ammonia gas was blown into the flask for neutralization. After completion of the neutralization, the remaining 6FB and methanol were removed under reduced pressure. After the cooling, the reaction solution was filtered to obtain 174 g of a transparent colorless liquid. According to $^{13}$C-NMR analysis of the obtained reaction product (hereinafter referred to as "FS11"), it was confirmed that the ratio of perfluoro group/methoxy group was 0.11 (mole ratio). The fluorine content thereof was 16.1% by mass.

Synthesis Example 4

Into a 5,000 ml four-necked flask equipped with a stirrer, thermometer and dropping funnel were poured 2,013 g (11.06 mol) of 6FB, 9.03 g (0.50 mol) of ion exchange water and 8.22 g of 35% hydrochloric acid, and then 2,083 g of MKC Silicate MS56 was poured in the flask with stirring. After three-hour refluxing, components having a low boiling point were distilled off. When flowing out of a distillate stopped, the flask was cooled and ammonia gas was blown into the flask for neutralization. After completion of the neutralization, the remaining 6FB and methanol were removed under reduced pressure. After the cooling, the reaction solution was filtered to obtain 3,032 g of a transparent colorless liquid. According to $^{13}$C-NMR analysis of the obtained reaction product (hereinafter referred to as "FS27"), it was confirmed that the ratio of perfluoro group/methoxy group was 0.27 (mole ratio). The fluorine content thereof was 27.1% by mass.

Synthesis Example 5

Into a 300 ml four-necked flask equipped with a stirrer, thermometer and dropping funnel were poured 96.8 g (0.53 mol) of 6FB, 3.68 g (0.20 mol) of ion exchange water and 0.18 g of trifluoromethanesulfonic acid, and then 250 g of SILI- CATE 40 (ethyl silicate available from TAMA CHEMICAL CO., Ltd., tetramer in average) was poured in the flask with stirring. After one-hour refluxing, components having a low boiling point were distilled off. When flowing out of a distillate stopped, the flask was cooled and ammonia gas was blown into the flask for neutralization. After completion of the neutralization, the remaining 6FB and ethanol were removed under reduced pressure. After the cooling, the reaction solution was filtered to obtain 246 g of a transparent colorless liquid. According to $^{13}$C-NMR analysis of the obtained reaction product (hereinafter referred to as "FS11 Et"), it was confirmed that the ratio of perfluoro group/ethoxy group was 0.11 (mole ratio). The fluorine content thereof was 12.7% by mass.

Synthesis Example 6

Into a 300 ml four-necked flask equipped with a stirrer, thermometer and dropping funnel were poured 160 g (0.88 mol) of 6FB, 2.94 g (0.16 mol) of ion exchange water and 0.18 g of trifluoromethanesulfonic acid, and then 200 g of SILICATE 40 was poured in the flask with stirring. After one-hour refluxing, components having a low boiling point were distilled off. When flowing out of a distillate stopped, the flask was cooled and ammonia gas was blown into the flask for neutralization. After completion of the neutralization, the remaining 6FB and ethanol were removed under reduced pressure. After the cooling, the reaction solution was filtered to obtain 235 g of a transparent colorless liquid. According to $^{13}$C-NMR analysis of the obtained reaction product (hereinafter referred to as "FS28Et"), it was confirmed that the ratio of perfluoro group/ethoxy group was 0.28 (mole ratio). The fluorine content thereof was 24.7% by mass.

Synthesis Example 7

Into a 200 ml four-necked flask equipped with a stirrer, thermometer and dropping funnel were poured 142 g (0.78 mol) of 6FB, 0.64 g (0.04 mol) of ion exchange water and 0.29 g of 35% hydrochloric acid, and then 147 g of MKC Silicate MS56 was poured in the flask with stirring. After three-hour refluxing, components having a low boiling point were distilled off. When flowing out of a distillate stopped, the flask was cooled and ammonia gas was blown into the flask for neutralization. After completion of the neutralization, the remaining 6FB and methanol were removed under reduced pressure. After the cooling, the reaction solution was filtered to obtain 174 g of a transparent colorless liquid. According to $^{13}$C-NMR analysis of the obtained reaction product (hereinafter referred to as "FS19"), it was confirmed that the ratio of perfluoro group/methoxy group was 0.19 (mole ratio). The fluorine content thereof was 22.7% by mass.

Synthesis Example 8

Into a 5,000 ml four-necked flask equipped with a stirrer, thermometer and dropping funnel were poured 2,209 g (12.14 mol) of 6FB, 8.03 g (0.45 mol) of ion exchange water and 7.30 g of 35% hydrochloric acid, and then 1,429 g of MKC Silicate MS56 was poured in the flask with stirring. After three-hour refluxing, components having a low boiling point were distilled off. When flowing out of a distillate stopped, the flask was cooled and ammonia gas was blown into the flask for neutralization. After completion of the neutralization, the remaining 6FB and methanol were removed under reduced pressure. After the cooling, the reaction solution was filtered to obtain 2,307 g of a transparent colorless liquid. According to $^{13}$C-NMR analysis of the obtained reaction product (hereinafter referred to as "FS39"), it was confirmed that the ratio of perfluoro group/methoxy group was 0.39 (mole ratio). The fluorine content thereof was 31.8% by mass.

Synthesis Example 9

Into a 5,000 ml four-necked flask equipped with a stirrer, thermometer and dropping funnel were poured 3,372 g (18.53 mol) of 6FB, 8.03 g (0.63 mol) of ion exchange water and 10.27 g of 35% hydrochloric acid, and then 1,750 g of MKC Silicate MS56 was poured in the flask with stirring. After three-hour refluxing, components having a low boiling point were distilled off. When flowing out of a distillate stopped, the flask was cooled and ammonia gas was blown into the flask for neutralization. After completion of the neutralization, the remaining 6FB and methanol were removed under reduced pressure. After the cooling, the reaction solution was filtered to obtain 3,000 g of a transparent colorless liquid. According to $^{13}$C-NMR analysis of the obtained reaction product (hereinafter referred to as "FS50"), it was confirmed that the ratio of perfluoro group/methoxy group was 0.50 (mole ratio). The fluorine content thereof was 34.6% by mass.

Example 1

For the purpose of evaluating the effect of the fluorine-containing organosilicon compound (B), a coating composition comprising the following components was prepared. Only the amount of the component (B) was changed as shown in Table 1.

(Components)

| | |
|---|---|
| Polyester Resin 1 | 43 parts |
| Curing agent (Cymel 303 (melamine resin available from Japan Cytec Co., Ltd. | 7 parts |
| Curing catalyst (Catalyst 602 (acid catalyst available from Japan Cytec Co., Ltd. | 0.2 part |
| Organic solvent (a solvent mixture of solvent naphtha 100 and cyclohexanone in a ratio of 2:1) | 49.8 parts |
| Fluorine-containing organosilicon compound (B) | Amount was changed (Table 1) |
| Component (C) (butanol) | 10 parts |

MKC Silicate MS56 of the component (B) is a non-fluorine-containing silicon compound which is a decamer in average of methyl silicate available from MITSUBISHI CHEMICAL CORPORATION.

These components were stirred and mixed to prepare a homogeneous coating composition. Five minutes after the preparation, the composition was coated on a Substrate 1 explained below by using a No. 30 bar coater, followed by three-minute drying at 230° C. with a dryer to make a coated sheet.

By using this coated sheet, evaluation of a degree of hydrophilization of a coating film (dipping for 120 hours) and staining by exposure, measurement of gloss and oil ink staining test were carried out by the methods explained below. The results are shown in Table 1.

Also, this coating composition was coated on a Substrate 2 explained below, followed by three-minute drying at 230° C. with a dryer to make a coated sheet. By using this coated sheet, evaluation of pencil hardness, water resistance test and chemical resistance test were carried out by the methods explained below. The results are shown in Table 1.

Further, this coating composition was coated on a Substrate 3 explained below, followed by three-minute drying at 230° C. with a dryer to make a coated sheet. This coated sheet was dried, and haze value was measured by the method explained below. The results are shown in Table 1.

(Substrate)
Substrate 1: Aluminum sheet (JS H4000A-1050P AM712: 0.5 mm thick) coated with a white coating of a fluorine-containing resin
(The white coating of a fluorine-containing resin was a coating prepared by pouring 462 g of tetrafluoroethylene (TFE) type curable fluorine-containing resin solution (ZEFFLE GK570 (trade name) available from DAIKIN INDUSTRIES, LTD.), 250 g of titanium oxide (JR805 (trade name) available from Tayca Corporation), 238 g of butyl acetate and 950 g of glass beads in a portable sand mill (three blade type) and stirring and dispersing at 1,500 rpm for one hour. The Substrate 1 was prepared by coating a mixture comprising 100 g of this white coating, 6.5 g of a curing agent (SUMIJULE N3300 (trade name) available from Sumitomo Bayer Urethane Co., Ltd.) and 100 g of butyl acetate as a solvent, and then drying it (at 80° C. for 3 hours)).

Substrate 2: Aluminum sheet (JS H4000A-1050P AM712: 0.5 mm thick)
Substrate 3: Glass sheet (2 mm thick)

(Degree of Hydrophilization of Coating Film)
The coated sheet is dipped in ion exchange water at 25° C., and after taken out from water, was allowed to stand for one hour in a chamber of 21° C. and 65% of humidity, and then, a contact angle is measured with a contact angle meter (Model CA-DTA available from Kyowa Chemical Industries, Co., Ltd.). The Substrate 1 is used.

(Staining by Exposure)
The test sheet is set on an exposure rack placed at an angle of 30° from a level being faced toward southern direction on a roof of a 4-storied building in a factory area of Osaka, and exposure test is carried out. The exposure is continued for three months. A lightness (L*) of the test sheet is measured, and a color difference (−ΔL*) before and after the exposure is evaluated. The Substrate 1 is used.

(Pencil Hardness)
Evaluation is made in accordance with JIS K 5600. The Substrate 2 is used.
(Gloss)
Evaluation is made in accordance with JIS K 5600. The Substrate 1 is used.
(Oil Ink Staining Test)
A 10 mm×10 mm area of the coating film is painted with a felt pen of red ink (available from Magic Ink Co., Ltd.) and is allowed to stand at 25° C. for 24 hours. Then, the coated surface is wiped using ethanol and a state of remaining red ink is evaluated by measuring a color difference ΔE before and after the test with a color difference meter. The Substrate 1 is used.
(Water Resistance Test)
A coated sheet is immersed in hot water of 60° C. for 14 days and then taken out to evaluate its appearance with naked eyes by the following criteria. The Substrate 2 is used.
Criteria for Evaluation
3: There is no abnormality.
2: There is cloudiness.
1: There is significant cloudiness.
(Chemical Resistance Test)
1. Alkali Resistance Test
A droplet of 40% aqueous solution of NaOH is placed on a coating film and is allowed to stand for three hours. Then, after washing with water, a state of the coating film is confirmed. The Substrate 2 is used.
2. Acid Resistance Test
A droplet of 40% aqueous solution of HCl is placed on a coating film and is allowed to stand for three hours. Then, after washing with water, a state of the coating film is confirmed. The Substrate 2 is used.
Evaluation is made by the following criteria.
Criteria for Evaluation
3: There is no abnormality.
2: There is somewhat discoloration or blistering.
1: There is significant discoloration or blistering.
(Haze)
Measurement is made in accordance with ASTM D 1003 by using Haze Guard II available from Kabushiki Kaisha Toyo Seiki Seisakusho. A unit is represented by %. The Substrate 3 is used.

In Table 1, the amounts of the components (B) and (C) represent amounts based on 100 parts by mass of the resin (This is applied to Tables 2 to 6 in the same manner).

TABLE 1

| Experimental Example | Resin | Curing agent | Curing catalyst | Organic solvent | Component (B) Kind | Component (B) Amount | Component (C) Kind | Component (C) Amount |
|---|---|---|---|---|---|---|---|---|
| 1-1 | 43 | 7 | 0.2 | 49.8 | Nil | — | Nil | — |
| 1-2 | 43 | 7 | 0.2 | 49.8 | FS11 | 0.14 | BuOH | 10 |
| 1-3 | 43 | 7 | 0.2 | 49.8 | FS11 | 0.28 | BuOH | 10 |
| 1-4 | 43 | 7 | 0.2 | 49.8 | FS11 | 0.42 | BuOH | 10 |
| 1-5 | 43 | 7 | 0.2 | 49.8 | FS11 | 0.56 | BuOH | 10 |
| 1-6 | 43 | 7 | 0.2 | 49.8 | FS11 | 1.12 | BuOH | 10 |
| 1-7 | 43 | 7 | 0.2 | 49.8 | FS11 | 2.24 | BuOH | 10 |
| 1-8 | 43 | 7 | 0.2 | 49.8 | FS27 | 0.14 | BuOH | 10 |
| 1-9 | 43 | 7 | 0.2 | 49.8 | FS27 | 0.28 | BuOH | 10 |
| 1-10 | 43 | 7 | 0.2 | 49.8 | FS27 | 0.42 | BuOH | 10 |
| 1-11 | 43 | 7 | 0.2 | 49.8 | FS27 | 0.56 | BuOH | 10 |
| 1-12 | 43 | 7 | 0.2 | 49.8 | FS27 | 1.12 | BuOH | 10 |
| 1-13 | 43 | 7 | 0.2 | 49.8 | FS27 | 2.24 | BuOH | 10 |
| 1-14 | 43 | 7 | 0.2 | 49.8 | FS27 | 4.47 | BuOH | 10 |
| 1-15 | 43 | 7 | 0.2 | 49.8 | MS56 | 0.14 | BuOH | 10 |
| 1-16 | 43 | 7 | 0.2 | 49.8 | MS56 | 0.28 | BuOH | 10 |
| 1-17 | 43 | 7 | 0.2 | 49.8 | MS56 | 0.42 | BuOH | 10 |
| 1-18 | 43 | 7 | 0.2 | 49.8 | MS56 | 0.56 | BuOH | 10 |

TABLE 1-continued

| | | | | | | | | |
|---|---|---|---|---|---|---|---|---|
| 1-19 | 43 | 7 | 0.2 | 49.8 | MS56 | 1.12 | BuOH | 10 |
| 1-20 | 43 | 7 | 0.2 | 49.8 | MS56 | 2.24 | BuOH | 10 |
| 1-21 | 43 | 7 | 0.2 | 49.8 | MS56 | 4.47 | BuOH | 10 |

| | Characteristics | | | | | | | | |
|---|---|---|---|---|---|---|---|---|---|
| Experiment Example | Degree of Hydrophilization (degree) | Staining by exposure ($-\Delta L^*$) | Pencil hardness | Gloss | Staining with oil ink ($\Delta E$) | Water resistance | Chemical resistance test NaOH | HCl | Haze |
| 1-1 | 88 | 7.38 | F | 100.0 | 3.9 | 3 | 3 | 3 | 0.6 |
| 1-2 | 33.5 | — | — | — | — | — | — | — | — |
| 1-3 | 17.8 | 2.16 | F | 100.0 | 2.6 | 3 | 3 | 3 | 0.3 |
| 1-4 | 13.6 | — | — | — | — | — | — | — | — |
| 1-5 | 13.5 | — | — | — | — | — | — | — | — |
| 1-6 | 10.8 | — | — | — | — | — | — | — | — |
| 1-7 | 12.3 | — | — | — | — | — | — | — | — |
| 1-8 | 23.6 | 3.26 | F | 101.0 | 3.9 | 3 | 3 | 3 | 0.3 |
| 1-9 | 16.2 | 1.81 | F | 100.0 | 2.5 | 3 | 3 | 3 | 0.5 |
| 1-10 | 12.3 | 1.51 | F | 100.0 | 1.3 | — | — | — | — |
| 1-11 | 19.7 | 1.08 | F | 99.8 | 2.7 | 3 | 3 | 3 | 2.4 |
| 1-12 | 20.5 | 0.95 | F | 98.7 | 2.7 | 2 | 2 | 3 | 4.9 |
| 1-13 | 20.1 | 0.66 | F | 95.9 | 2.3 | 1 | 1 | 3 | 35.8 |
| 1-14 | 21.0 | 0.63 | H | — | — | 1 | 1 | 3 | 51.3 |
| 1-15 | 56.5 | 5.75 | F | 99.8 | 3.1 | 3 | 3 | 3 | 0.2 |
| 1-16 | 37.7 | 4.72 | F | 99.2 | 4.3 | 3 | 3 | 3 | 0.2 |
| 1-17 | 31.9 | 3.75 | F | 99.1 | 3.1 | — | — | — | — |
| 1-18 | 24.3 | 2.46 | F | 99.5 | 3.2 | 3 | 3 | 3 | 0.5 |
| 1-19 | 25.3 | 1.91 | F | 99.8 | 6.5 | 2 | 2 | 3 | 2.2 |
| 1-20 | 28 | 1.42 | F | 97.0 | 7.7 | 1 | 1 | 3 | 14.5 |
| 1-21 | — | — | F | — | — | 1 | 1 | 3 | 64.3 |

From Table 1, it is seen that as compared with non-fluorinated silicon compounds, the fluorinated silicon compounds are easily subject to surface-hydrophilization, contact angles thereof are greatly lowered even in the case of the same amount, and stain-proof property in the exposure is more satisfactory even in the case of the same amount, and the fluorine-containing silicon compound exhibiting stain-proofing effect in the exposure even in a small amount is effective for maintaining physical properties of the coating film since water resistance, gloss, haze, stain-proof property for oil ink and alkali resistance of a coating film are lowered by increase in amount of silicon compound.

Example 2

Coating compositions were prepared in the same manner as in Example 1 except that kind of the fluorine-containing organosilicon compound (B) and the component (C) were changed as shown in Table 2. After the preparation, the prepared coating compositions were allowed to stand for five minutes (0 hour), two hours, four hours, eight hours, 24 hours and 168 hours (7 days), respectively and were coated on the Substrate 1 in the same manner as in Example 1, followed by three-minute drying with a dryer of 230° C. to prepare coated sheets. By using these coated sheets, degree of hydrophilization (dipping for forty hours) and stain-proof property of the coating films in the exposure were evaluated in the same manner as in Example 1.

The results are shown in Table 2.

Et40 represents SILICATE 40 (ethyl silicate available from Tama Chemical Co., Ltd., tetramer in average).

TABLE 2

| | Coating composition (part by mass) | | | | | | | |
|---|---|---|---|---|---|---|---|---|
| Experimental Example | Resin | Curing agent | Curing catalyst | Organic solvent | Component (B) Kind | Amount | Component (C) Kind | Amount |
| 2-1 | 43 | 7 | 0.2 | 49.8 | Nil | — | Nil | — |
| 2-2 | 43 | 7 | 0.2 | 49.8 | FS11 | 0.28 | Nil | — |
| 2-3 | 43 | 7 | 0.2 | 49.8 | FS11 | 0.28 | BuOH | 10 |
| 2-4 | 43 | 7 | 0.2 | 49.8 | FS11 | 0.28 | Octanol | 10 |
| 2-5 | 43 | 7 | 0.2 | 49.8 | FS11 | 0.28 | Ethyl orthoformate | 10 |
| 2-6 | 43 | 7 | 0.2 | 49.8 | FS27 | 0.28 | Nil | — |
| 2-7 | 43 | 7 | 0.2 | 49.8 | FS27 | 0.28 | BuOH | 10 |
| 2-8 | 43 | 7 | 0.2 | 49.8 | FS27 | 0.28 | Octanol | 10 |
| 2-9 | 43 | 7 | 0.2 | 49.8 | FS27 | 0.28 | Ethyl orthoformate | 10 |
| 2-10 | 43 | 7 | 0.2 | 49.8 | FS11Et | 0.28 | BuOH | 10 |
| 2-11 | 43 | 7 | 0.2 | 49.8 | FS28Et | 0.28 | BuOH | 10 |
| 2-12 | 43 | 7 | 0.2 | 49.8 | MS56 | 0.28 | Nil | 10 |
| 2-13 | 43 | 7 | 0.2 | 49.8 | Et40 | 0.28 | Nil | 10 |

TABLE 2-continued

| | Characteristics | | | | | | | | | | | |
|---|---|---|---|---|---|---|---|---|---|---|---|---|
| | Hydrophilization (degree) (time for allowing to stand) | | | | | | Staining by exposure (−ΔL*) (time for allowing to stand) | | | | | |
| Experimental Example | 0 | 2 | 4 | 8 | 24 | 168 | 0 | 2 | 4 | 8 | 24 | 168 |
| 2-1 | 92.0 | — | — | 90.0 | — | 88.0 | 4.0 | — | — | 4.0 | — | 4.1 |
| 2-2 | 23.4 | 27.6 | 35.7 | 44.9 | 87.4 | 83.4 | 0.9 | 0.7 | 0.9 | 1.8 | 2.6 | 2.4 |
| 2-3 | 23.4 | — | — | 30.4 | 43.1 | 79.6 | 0.9 | — | — | 1.2 | 1.3 | 2.1 |
| 2-4 | 23.4 | — | — | 33.7 | 66.9 | 90.1 | 0.9 | — | — | 1.0 | 1.7 | 2.4 |
| 2-5 | 23.4 | — | — | 41.8 | 39.3 | 37.5 | 0.9 | — | — | 1.4 | 1.3 | 1.2 |
| 2-6 | 24.3 | 35.5 | 67.3 | 88.6 | 89.1 | 84.7 | 0.7 | 1.0 | 2.2 | 2.5 | 2.7 | 2.4 |
| 2-7 | 24.3 | — | — | 35.9 | 79.6 | 86.8 | 0.7 | — | — | 1.2 | 1.9 | 2.2 |
| 2-8 | 24.3 | — | — | 69.0 | 85.2 | 89.7 | 0.7 | — | — | 1.7 | 2.4 | 2.5 |
| 2-9 | 24.3 | — | — | 46.1 | 49.9 | 47.8 | 0.7 | — | — | 1.7 | 2.2 | 2.0 |
| 2-10 | 70.2 | 71.9 | 63.4 | 57.3 | 46.0 | 32.0 | 2.5 | 2.4 | 2.4 | 2.1 | 2.0 | 1.2 |
| 2-11 | 43.9 | 29.9 | 37.3 | 34.9 | 37.1 | 75.0 | 1.9 | 1.5 | 1.6 | 1.2 | 1.3 | 2.1 |
| 2-12 | 36.0 | 42.7 | 41.3 | 39.4 | 70.7 | 82.8 | 1.8 | 1.8 | 1.8 | 1.7 | 2.3 | 2.4 |
| 2-13 | 73.0 | — | — | 83.0 | — | — | 3.4 | — | — | 3.2 | — | — |

From Table 2, it is seen that in the case of the composition comprising butanol, octanol or ethyl orthoformate, surface hydrophilization and stain-proofing property in the exposure are maintained even if a period of time (pot life) from the mixing of the fluorine-containing silicon compound to the coating is longer, as compared with the composition comprising neither butanol, octanol nor ethyl orthoformate.

Example 3

Coating compositions were prepared in the same manner as in Example 1 except that kinds of the polyester resin and the fluorine-containing organosilicon compound (B) were changed as shown in Table 3. After the preparation, the respective prepared coating compositions were allowed to stand for five minutes, and were coated on the Substrate 1 in the same manner as in Example 1, followed by three-minute drying with a dryer of 230° C. to prepare coated sheets. By using these coated sheets, degree of hydrophilization (dipping for forty hours) and stain-proof property in the exposure of the coating films (three-month exposure) were evaluated in the same manner as in Example 1.

Resin 3 represents a solution of tetrafluoroethylene (TFE) type curable fluorine-containing resin (ZEFFLE GK570 (trade name) available from DAIKIN INDUSTRIES, LTD., solid content: 65% by mass, solvent: butyl acetate, hydroxyl value: 60 mgKOH/g, acid value: 3 mgKOH/g, number average molecular weight: 12,000).

The results are shown in Table 3.

TABLE 3

| | Coating composition (part by mass) | | | | | | | | |
|---|---|---|---|---|---|---|---|---|---|
| Experimental Example | Resin | | Curing agent | Curing catalyst | Organic solvent | Component (B) | | Component (C) | |
| | Kind | Amount | | | | Kind | Amount | Kind | Amount |
| 3-1 | Resin 1 | 43 | 7 | 0.2 | 49.8 | FS11 | 0.28 | BuOH | 10 |
| 3-2 | Resin 1 | 43 | 7 | 0.2 | 49.8 | FS19 | 0.28 | BuOH | 10 |
| 3-3 | Resin 1 | 43 | 7 | 0.2 | 49.8 | FS27 | 0.28 | BuOH | 10 |
| 3-4 | Resin 1 | 43 | 7 | 0.2 | 49.8 | MS56 | 0.28 | BuOH | 10 |
| 3-5 | Resin 1 | 43 | 7 | 0.2 | 49.8 | Nil | — | Nil | — |
| 3-6 | Resin 2 | 37 | 7 | 0.2 | 55.8 | FS11 | 0.28 | BuOH | 10 |
| 3-7 | Resin 2 | 37 | 7 | 0.2 | 55.8 | FS19 | 0.28 | BuOH | 10 |
| 3-8 | Resin 2 | 37 | 7 | 0.2 | 55.8 | FS27 | 0.28 | BuOH | 10 |
| 3-9 | Resin 2 | 37 | 7 | 0.2 | 55.8 | FS39 | 0.28 | BuOH | 10 |
| 3-10 | Resin 2 | 37 | 7 | 0.2 | 55.8 | MS56 | 0.28 | BuOH | 10 |
| 3-11 | Resin 2 | 37 | 7 | 0.2 | 55.8 | Nil | — | Nil | — |
| 3-12 | Resin 3 | 43 | 7 | 0.2 | 49.8 | FS11 | 0.28 | BuOH | 10 |
| 3-13 | Resin 3 | 43 | 7 | 0.2 | 49.8 | FS19 | 0.28 | BuOH | 10 |
| 3-14 | Resin 3 | 43 | 7 | 0.2 | 49.8 | FS27 | 0.28 | BuOH | 10 |
| 3-15 | Resin 3 | 43 | 7 | 0.2 | 49.8 | FS39 | 0.28 | BuOH | 10 |

TABLE 3-continued

| | | | | | | | | | |
|---|---|---|---|---|---|---|---|---|---|
| 3-16 | Resin 3 | 43 | 7 | 0.2 | 49.8 | MS56 | 0.28 | BuOH | 10 |
| 3-17 | Resin 3 | 43 | 7 | 0.2 | 49.8 | Nil | — | Nil | — |

Characteristics

| Experimental Example | Hydrophilization (degree) | Staining by exposure ($-\Delta L^*$) |
|---|---|---|
| 3-1 | 35.9 | 1.2 |
| 3-2 | 37.4 | 1.4 |
| 3-3 | 28.1 | 0.8 |
| 3-4 | 34.7 | 3.8 |
| 3-5 | 86.0 | 6.2 |
| 3-6 | 41.1 | 1.1 |
| 3-7 | 41.8 | 1.3 |
| 3-8 | 20.2 | 0.6 |
| 3-9 | 36.8 | 1.5 |
| 3-10 | 48.2 | 3.5 |
| 3-11 | 90.0 | 5.8 |
| 3-12 | 52.1 | 3.1 |
| 3-13 | 46.0 | 2.9 |
| 3-14 | 36.5 | 2.4 |
| 3-15 | 75.6 | 4.3 |
| 3-16 | 83.8 | 5.0 |
| 3-17 | 89.0 | 5.0 |

From Table 3, it is seen that an effect of improving surface hydrophilization and stain-proof property in the exposure is exhibited more effectively when the fluorine-containing silicon compound is added to a polyester resin than when it is added to a fluorine-containing resin.

Example 4

Coating compositions were prepared in the same manner as in Example 1 except that kinds of the fluorine-containing organosilicon compound (B) and the component (C) were changed as shown in Table 4. After the preparation, the prepared coating compositions were allowed to stand for five minutes (0 hour) and eight hours, respectively and were coated on the Substrate 1 in the same manner as in Example 1, followed by three-minute drying with a dryer of 230° C. to prepare coated sheets. By using these coated sheets, degree of hydrophilization and stain-proof property of the coating films in the exposure were evaluated in the same manner as in Example 1. In the exposure test, the coated sheets were subjected to exposure for 29 days, and degree of hydrophilization was measured after 60-hour dipping in water.

TABLE 4

Coating composition (part by mass)

| Experimental Example | Resin | Curing agent | Curing catalyst | Organic solvent | Component (B) Kind | Amount | Component (C) Kind | Amount |
|---|---|---|---|---|---|---|---|---|
| 4-1 | 43 | 7 | 0.2 | 49.8 | Nil | — | Nil | — |
| 4-2 | 43 | 7 | 0.2 | 49.8 | FS27 | 0.28 | Nil | — |
| 4-3 | 43 | 7 | 0.2 | 49.8 | FS27 | 0.28 | BuOH | 10 |
| 4-4 | 43 | 7 | 0.2 | 49.8 | FS27 | 0.28 | BuOH | 20 |

Characteristics

| Experimental Example | Hydrophilization (degree) | | Staining by exposure ($-\Delta L^*$) | |
|---|---|---|---|---|
| | 0 hr (initial stage) | 8 hrs after | 0 hr (initial stage) | 8 hrs after |
| 4-1 | 96 | 92 | 1.51 | 1.5 |
| 4-2 | 19 | 85 | 0.19 | 1.41 |
| 4-3 | 19 | 34 | 0.16 | 0.41 |
| 4-4 | 19 | 29 | 0.05 | 0.41 |

From Table 4, it is seen that the coating compositions comprising butanol are excellent in surface hydrophilization and stain-proof property after the eight-hour exposure. There is no big difference in characteristics between the amount of butanol of 10% by mass and the amount of butanol of 20% by mass based on the composition.

Example 5

Coating compositions were prepared in the same manner as in Example 1 except that kinds of the fluorine-containing organosilicon compound (B) and the component (C) were changed as shown in Table 5. After the preparation, the prepared coating compositions were allowed to stand for five minutes (0 hour) and eight hours, respectively and were coated on the Substrate 1 in the same manner as in Example 1, followed by three-minute drying with a dryer of 230° C. to prepare coated sheets. By using these coated sheets, degree of hydrophilization (dipping for 60 hours) and stain-proof property in the exposure (exposure for 33 days) of the coating films were evaluated in the same manner as in Example 1, and further, appearance of the coating films was evaluated by the following method.

The results are shown in Table 5.

(Appearance of Coating Film)

Each coating composition was coated on a glass sheet with a No. 30 bar coater and air-dried, and a state of the coating films is observed with naked eyes immediately after the coating (initial stage), eight hours after and 48 hours after, respectively.

TABLE 5

| Experimental Example | Coating composition (part by mass) | | | | | | | |
|---|---|---|---|---|---|---|---|---|
| | Resin | Curing agent | Curing catalyst | Organic solvent | Component (B) | | Component (C) | |
| | | | | | Kind | Amount | Kind | Amount |
| 5-1 | 43 | 7 | 0.2 | 49.8 | Nil | — | Nil | — |
| 5-2 | 43 | 7 | 0.2 | 49.8 | FS11 | 0.28 | Nil | — |
| 5-3 | 43 | 7 | 0.2 | 49.8 | FS19 | 0.28 | Nil | — |
| 5-4 | 43 | 7 | 0.2 | 49.8 | FS27 | 0.28 | Nil | — |
| 5-5 | 43 | 7 | 0.2 | 49.8 | FS39 | 0.28 | Nil | — |
| 5-6 | 43 | 7 | 0.2 | 49.8 | FS50 | 0.28 | Nil | — |
| 5-7 | 43 | 7 | 0.2 | 49.8 | FS11 | 0.28 | BuOH | 5 |
| 5-8 | 43 | 7 | 0.2 | 49.8 | FS11 | 0.28 | BuOH | 10 |
| 5-9 | 43 | 7 | 0.2 | 49.8 | FS19 | 0.28 | BuOH | 10 |
| 5-10 | 43 | 7 | 0.2 | 49.8 | FS27 | 0.28 | BuOH | 10 |
| 5-11 | 43 | 7 | 0.2 | 49.8 | FS39 | 0.28 | BuOH | 10 |
| 5-12 | 43 | 7 | 0.2 | 49.8 | FS50 | 0.28 | BuOH | 10 |

| Experimental Example | Characteristics | | | | | | |
|---|---|---|---|---|---|---|---|
| | Hydrophilization (degree) (time for allowing to stand) | | Appearance of coating film (time for allowing to stand) | | | Staining by exposure ($-\Delta L^*$) (time for allowing to stand) | |
| | 0 | 8 | 0 | 8 | 48 | 0 | 8 |
| 5-1 | 86.7 | 91.6 | ○ | ○ | ○ | 1.99 | 2.10 |
| 5-2 | 22.8 | 25.2 | ○ | ○ | ○ | 0.58 | 0.77 |
| 5-3 | 22.8 | 43.1 | ○ | ○ | ○ | 0.53 | 1.17 |
| 5-4 | 19.6 | 71.9 | ○ | ○ | ○ | 0.53 | 1.78 |
| 5-5 | 22.3 | 87.7 | ○ | ○ | ○ | 0.54 | 2.06 |
| 5-6 | 22.1 | 91.2 | ○ | ○ | Δ | 0.64 | 2.24 |
| 5-7 | 21.5 | 21.1 | ○ | ○ | ○ | 0.52 | 0.75 |
| 5-8 | 22.7 | 26.0 | ○ | ○ | ○ | 0.53 | 0.74 |
| 5-9 | 22.4 | 31.7 | ○ | ○ | ○ | 0.48 | 0.90 |
| 5-10 | 18.5 | 34.1 | ○ | ○ | ○ | 0.44 | 0.84 |
| 5-11 | 21.4 | 43.0 | ○ | ○ | ○ | 0.58 | 0.96 |
| 5-12 | 22.9 | 50.2 | ○ | ○ | ○ | 0.69 | 1.11 |

Evaluation was made by the following criteria.

○: There is neither lowering of gloss nor appearance of nibs.

Δ: Gloss is lowered and there are a small number of nibs.

X: Gloss is lowered and there are a lot of nibs.

From Table 5, it is seen that as the fluorine content of component (B) increases, degree of hydrophilization is decreased (contact angle increases) as time for allowing to stand elapses after the preparation of the coating compositions. By the addition of the component (C) (butanol), duration of hydrophilization is improved.

Example 6

Coating compositions were prepared in the same manner as in Example 1 except that kinds of the fluorine-containing organosilicon compound (B) and the component (C) were changed as shown in Table 6. After the preparation, the prepared coating compositions were allowed to stand for five minutes (0 hour), and were coated on the Substrate 1 in the same manner as in Example 1, followed by three-minute drying with a dryer of 230° C. to prepare coated sheets. By using these coated sheets, degree of hydrophilization and stain-proof property of the coating films in the exposure were evaluated in the same manner as in Example 1. The coated sheets were subjected to exposure for 29 days in the exposure test, and degree of hydrophilization was measured after 60-hour dipping in water.

TABLE 6

| | | | | | | | | | |
|---|---|---|---|---|---|---|---|---|---|
| Coating composition (part by mass) | | | | | | | | | |
| Experimental Example | Resin | Curing agent | Curing catalyst | Organic solvent | Component (B) | | Component (C) | | |
| | | | | | Kind | Amount | Kind | Amount | Kind | Amount |
| 6-1 | 43 | 7 | 0.2 | 49.8 | Nil | — | Nil | — | Nil | — |
| 6-2 | 43 | 7 | 0.2 | 49.8 | FS27 | 0.28 | Nil | — | BuOH | 10 |
| 6-3 | 43 | 7 | 0.2 | 49.8 | FS27 | 0.21 | MS56 | 0.07 | BuOH | 10 |
| 6-4 | 43 | 7 | 0.2 | 49.8 | FS27 | 0.14 | MS56 | 0.14 | BuOH | 10 |
| 6-5 | 43 | 7 | 0.2 | 49.8 | FS27 | 0.07 | MS56 | 0.21 | BuOH | 10 |
| 6-6 | 43 | 7 | 0.2 | 49.8 | Nil | — | MS56 | 0.28 | BuOH | 10 |

| | Characteristics | |
|---|---|---|
| Experimental Example | Hydrophilization (degree) 0 hr (initial stage) | Staining by exposure (−ΔL*) 0 hr (initial stage) |
| 6-1 | 96 | 1.51 |
| 6-2 | 19 | 0.19 |
| 6-3 | 17 | 0.14 |
| 6-4 | 20 | 0.07 |
| 6-5 | 27 | 0.45 |
| 6-6 | 36 | 0.68 |

From Table 6, it was confirmed that even when the component B comprising a mixture of a fluorine-containing organosilicon compound with an organosilicon compound is used, hydrophilization proceeds and stain deposition inhibiting property is exhibited in the exposure to the same extent as in the case of using a fluorine-containing organosilicon compound alone, and such a component B is superior to an organo silicon compound alone in hydrophilization and stain deposition inhibiting property. Even when the fluorine-containing silicon compound is replaced by an organosilicon compound up to 50% by mass, sufficient hydrophilic property and stain deposition inhibiting property can be obtained.

INDUSTRIAL APPLICABILITY

According to the coating composition of the present invention, a polyester coating composition being excellent in an action of inhibiting deposition of outdoor stain and stain caused by raindrop and being capable of extending a pot life can be provided.

More specifically the following effects are exhibited.

Since the organosilicon compound (B) is modified with fluorine, it easily migrates to a surface of a coating film and hydrophilic property is exhibited from an initial stage, thereby enabling stain deposition inhibiting property to be exhibited from an initial stage.

Even if the amount of organosilicon compound (B) is decreased, since excellent stain deposition inhibiting property is exhibited, transparency, water resistance, chemical resistance, weather resistance and processability of a coating film are not lowered.

Pot life of the coating composition after the preparation thereof is extended due to the presence of the aliphatic hydrocarbon compound having hydroxyl group and/or alkoxy compound (C), and therefore, an allowance of time for coating can be provided.

Effects are not limited to those mentioned above, and effects explained in Examples are also exhibited.

The invention claimed is:

1. A coating composition comprising:
   (A) a polyester resin,
   (B) at least one of fluorine-containing organosilicon compound having a fluorine content of 5 to 30% by mass and represented by the formula (I):

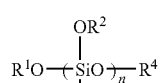

wherein $R^1$, $R^2$, $R^3$ and $R^4$ are the same or different and each is an alkyl group having 1 to 20 carbon atoms which may have hetero atom and may have polymerizable carbon-carbon double bond at its end; "n" is an integer of 1 to 30; at least one of $R^1$, $R^2$, $R^3$ and $R^4$ has fluorine atom,
   (C) from the group consisting of butanol, octanol and ethyl orthoformate, and
   (D) at least one of organic solvent other than the compound (C) and selected from the group consisting of hydrocarbon solvents, ketone solvents, ester solvents, amide solvents and sulfonic acid ester solvents.

2. The coating composition of claim 1, wherein the fluorine content of the fluorine-containing organosilicon compound (B) is 7 to 20% by mass.

3. The coating composition of claim 1, wherein 5 to 95% by mass of the fluorine-containing organosilicon compound (B) is replaced by a non-fluorine-containing organosilicon compound (G).

4. The coating composition of claim 1, wherein the organic solvent (D) is a hydrocarbon solvent and/or a ketone solvent.

5. The coating composition of claim 1, wherein the fluorine-containing organosilicon compound (B) is contained in an amount of 0.01 to 40 parts by mass and the compound (C) is contained in an amount of 0.01 to 500 parts by mass based on 100 parts by mass of the polyester resin (A), and the organic solvent (D) is contained in an amount to provide a solid content of 0.1 to 90% by mass.

6. The coating composition of claim 1, wherein the polyester resin (A) is a polyester resin having functional group and the composition further comprises a curing agent (E).

7. The coating composition of claim 6, wherein the polyester resin (A) is a polyester resin having hydroxyl group and the curing agent (E) is an amino resin curing agent.

8. The coating composition of claim 6, wherein the curing agent (E) is contained in an amount of 5 to 150 parts by mass based on 100 parts by mass of the polyester resin (A).

\* \* \* \* \*

UNITED STATES PATENT AND TRADEMARK OFFICE
CERTIFICATE OF CORRECTION

| | |
|---|---|
| PATENT NO. | : 9,175,177 B2 |
| APPLICATION NO. | : 12/523914 |
| DATED | : November 3, 2015 |
| INVENTOR(S) | : Masaru Nagato et al. |

It is certified that error appears in the above-identified patent and that said Letters Patent is hereby corrected as shown below:

Title Page

Delete "(87) PCT Pub. No.: WO2005/190812
           PCT Pub. Date: July 31, 2008"

Insert --(87) PCT Pub. No.: WO2008/090812
           PCT Pub. Date: July 31, 2008--

Signed and Sealed this
Fifth Day of April, 2016

Michelle K. Lee
*Director of the United States Patent and Trademark Office*